United States Patent [19]
Kiritsy et al.

[11] Patent Number: 5,443,536
[45] Date of Patent: Aug. 22, 1995

[54] TUBE SLITTING TOOL FOR ACCESSING OPTICAL FIBERS IN A BUFFER TUBE

[75] Inventors: Emmett R. Kiritsy; Grant M. Davidson, both of Columbia, S.C.

[73] Assignee: Pirelli Cable Corporation, Lexington, S.C.

[21] Appl. No.: 312,473

[22] Filed: Sep. 26, 1994

[51] Int. Cl.⁶ ............................................. H02G 1/12
[52] U.S. Cl. ...................................... 30/90.8; 30/90.4; 81/9.4
[58] Field of Search ............... 30/90.1, 90.4, 90.8, 30/92, 92.5; 81/9.4

[56] References Cited

U.S. PATENT DOCUMENTS

| | | | |
|---|---|---|---|
| 3,826,001 | 7/1974 | Bibrey et al. | 30/90.1 |
| 4,741,104 | 5/1988 | Noon | 30/90.4 |
| 4,947,549 | 8/1990 | Genovese et al. | 30/90.8 |
| 4,969,703 | 11/1990 | Fyfe et al. | 30/90.1 X |
| 4,972,581 | 11/1990 | McCollum et al. | 30/90.1 |
| 5,050,302 | 9/1991 | Mills | 30/90.8 |
| 5,093,992 | 3/1992 | Temple, Jr. et al. | 30/90.8 |

*Primary Examiner*—Hwei Siu Payer
*Attorney, Agent, or Firm*—Brooks Haidt Haffner & Delahunty

[57] ABSTRACT

A tube slitting tool for cutting a buffer tube and allowing access to one or more individual optical fibers or ribbons containing optical fibers encased therein, includes a first holder and a second holder in slidable contact with one another, each holder having a channel which when said holders engage forms a passageway therebetween to receive the buffer tube. Cutting blades are mounted to the holders and extend into the passageway such that when the fully-engaged tube slitting tool moves relative to the buffer tube, the tube is cut longitudinally, facilitating access to the optical fibers or the ribbons within the buffer tube.

25 Claims, 2 Drawing Sheets

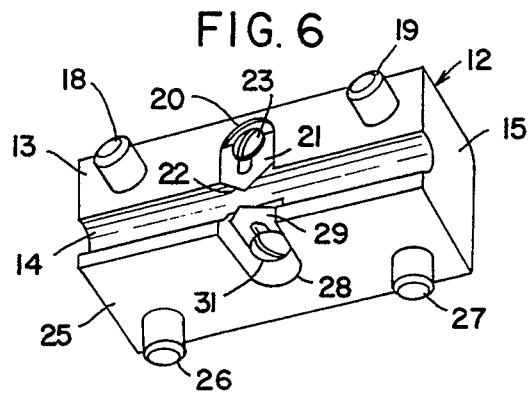
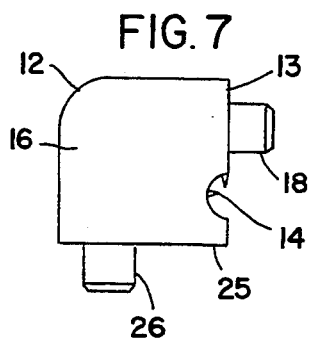
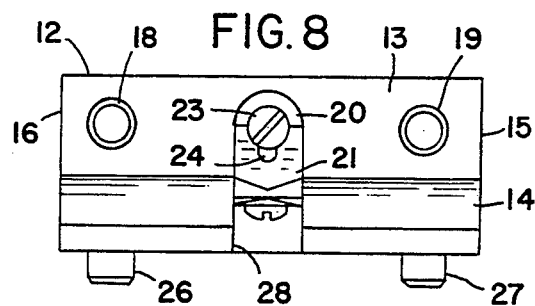
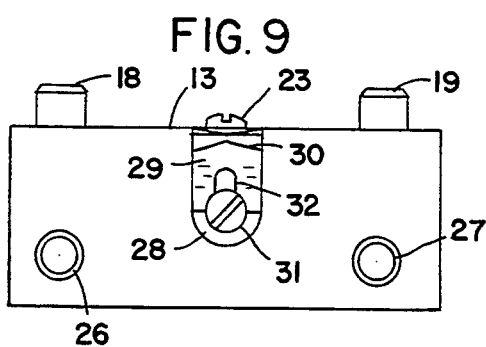
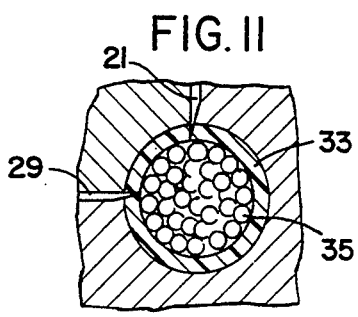
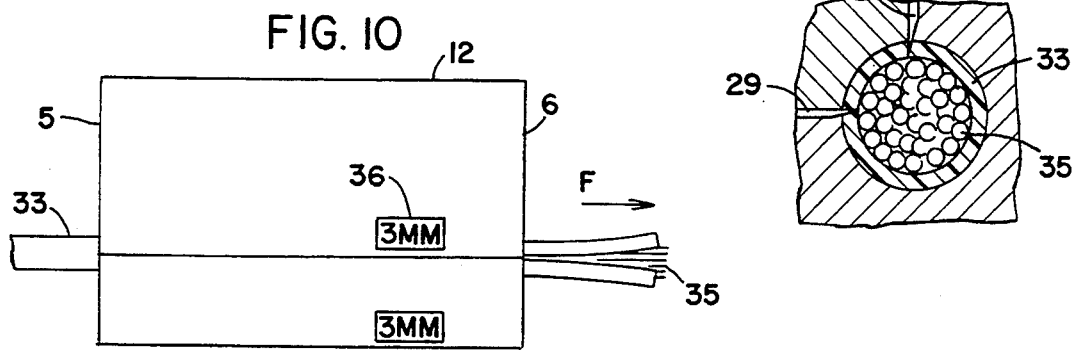

TUBE SLITTING TOOL FOR ACCESSING OPTICAL FIBERS IN A BUFFER TUBE

BACKGROUND OF THE INVENTION

1. Field of the Invention

The present invention relates to a cutting tool for cutting a through slit in a tube, such as a plastic buffer tube used to enclose loose optical fibers or ribbons containing optical fibers in an optical fiber cable, thereby facilitating access to the optical fibers encased therein.

2. BACKGROUND AND OBJECTS OF THE INVENTION

Because of their high bandwidth capacity and small physical size, optical fibers are now used in a wide variety of telecommunication applications. However, optical fibers are fragile, and are also susceptible to stress and bending, which cause optical attenuation and decreased transmission efficiency. Consequently, mechanical protection of the fibers is necessary.

One conventional way to protect optical fibers is to surround a group of several fibers or ribbons containing optical fibers loosely within a buffer tube of a plastic material which can have a wall thickness of up to 2 mm. It is often necessary, however, to remove a portion of the tube and splice or otherwise join one or more of the individual optical fibers or ribbons disposed within a given buffer tube to other optical fibers or to various devices, It is therefore advantageous to provide a buffer tube cutting or slitting device which permits cutting and removal of a portion of the buffer tube, thereby facilitating access to the fibers or ribbons without also cutting or otherwise disturbing the optical fibers or ribbons within the buffer tube. It is further advantageous to provide a cutting device capable of accessing optical fibers not only at the end portions of the buffer tube but also at intermediate portions of the tube, such as required in a branch splicing operation, which is usually more difficult and potentially disruptive to an operating telecommunications system transmitting through the remaining optical fibers.

Illustrative of prior art tube cutting tools are U.S. Pat. Nos. 4,741,104 and 4,947,549 which describe hinged devices having two opposed but axially displaced blades. U.S. Pat. No. 4,972,581 describes a tool having a blade that shaves or planes layers off a buffer tube to expose the fibers therein. U.S. Pat. No. 5,050,302 discloses a complicated device for radially slitting cylindrical objects having blades activated by manually holding down a button for each blade and requiring the optical fiber to be pulled through the device at least twice and at a substantial angle from the axis of the tool, thereby greatly bending and stressing any delicate materials within the cylindrical object, such as optical fibers within a loose buffer tube.

SUMMARY OF THE INVENTION

It is an object of the invention to provide a tool for cutting a through slit in a tube, such as a buffer tube loosely enclosing optical fibers or ribbons.

A further object of the invention is to provide a tool for facilitating access to one or more individual optical fibers or optical fiber ribbons within a buffer tube without compromising the integrity of the remaining fibers.

Another object of the invention is to provide a compact and hand-held tube slitting tool which is simple to use and manufacture.

In accordance with the preferred embodiment of the invention, a tube slitting tool for cutting a buffer tube and allowing access to one or more optical fibers or ribbons containing optical fibers therein includes a first and a second holder in slidable contact with each other. Each holder includes a channel which when said holders are slidably engaged forms a passageway therebetween adapted to receive the buffer tube therein. Preferably, at least two blades are mounted on one of the holders and extend into the passageway. By arranging a portion of the buffer tube within the channel of one holder and slidably engaging the holders together, and thereafter causing relative movement between the buffer tube and the holders, the blades cut a slit in the buffer tube which permits easy removal of the slit portion of the buffer tube, and permits access to the individual optical fibers or ribbons therein.

BRIEF DESCRIPTION OF THE DRAWINGS

Other objects and advantages of the present invention will be apparent from the following detailed description of the presently preferred embodiments thereof, which description should be considered in conjunction with the accompanying drawings in which:

FIG. 6 is a perspective view of a second holder of the present invention;

FIG. 7 is an end view of the holder shown in FIG. 6;

FIG. 8 is a front view of the holder shown in FIG. 6;

FIG. 9 is a bottom view of the holder shown in FIG. 6;

FIG. 10 is a front view of the tube slitting tool shown in FIG. 1 showing a portion of the buffer tube therein cut and revealing the optical fibers therein; and FIG. 11 is an end cross-sectional view of a portion of the tube slitting tool illustrated in FIG. 10 showing the blades cutting the buffer tube.

DETAILED DESCRIPTION OF THE PREFERRED EMBODIMENTS

The invention will be illustrated in connection with individual fibers enclosed in a tube, but such fibers can be replaced by a plurality of ribbons each containing a plurality of optical fibers.

Figure 1:
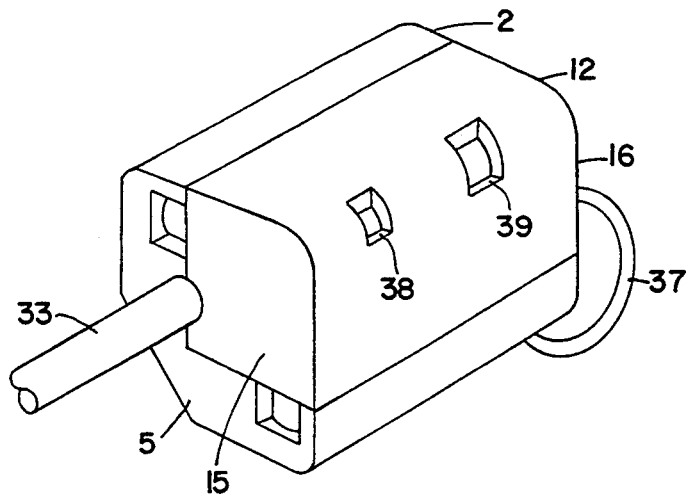
FIG. 1 is a perspective view of the tube slitting tool assembly of the present invention in the fully engaged position with a buffer tube therein.
Figure 2:
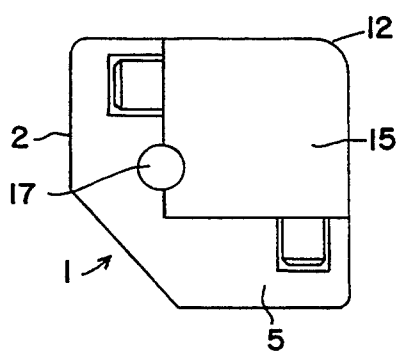
FIG. 2 is an end view of the tube slitting tool shown in FIG. 1 without the buffer tube.

With reference to FIGS. 1-10, the preferred embodiment of the tube slitting tool 1 of the invention has a first holder 2 and a second holder 12, each made of a metal, such as steel or aluminum, or a plastic, and slidably engageable with one another. FIGS. 1 and 2 illustrate the two holders in a face-to-face and fully engaged position.

Figure 3:
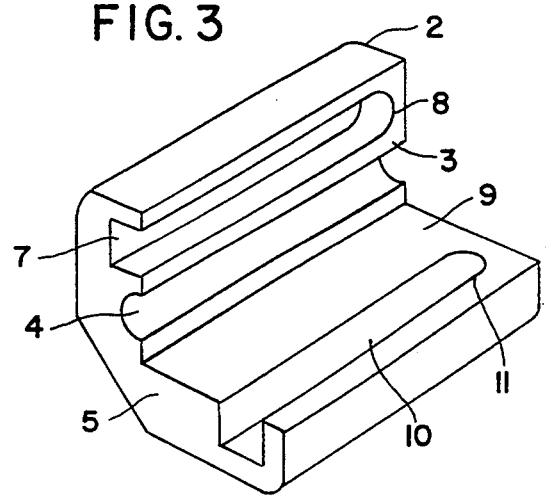
FIG. 3 is a perspective view of a first holder of the present invention.
Figure 4:
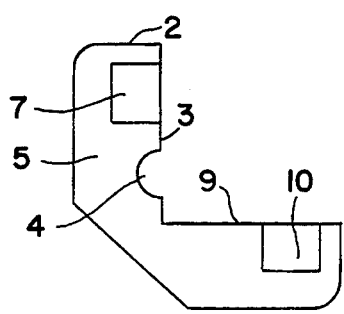
FIG. 4 is an end view of the holder shown in FIG. 3.
Figure 5:
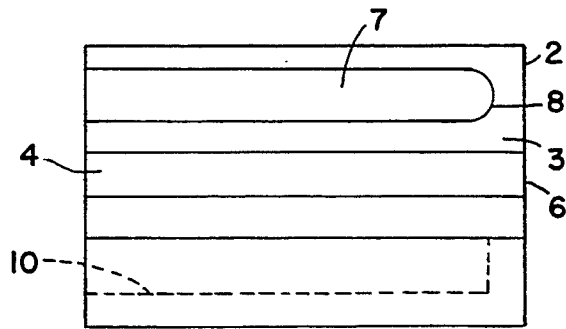
FIG. 5 is a side view of the holder shown in FIG. 3.

As shown in FIGS. 3 and 4, first holder 2 is substantially L-shaped and includes a first inner surface 3 and a second inner surface 9 extending at an angle to said first surface 3. Surface 3 includes an outwardly-opening first channel 4 extending inwardly from the surface 3 and from a front end 5 of holder 2 to a back end 6, as shown in FIGS. 3 and 5. Surface 3 further includes a first slot 7 spaced from and extending substantially parallel to said channel 4, extending inwardly into said first surface 3 and from said front end 5 and terminating at a terminus 8 before reaching back end 6. Channel 4 is preferably semi-circular in cross section and has a diameter commensurate with that of a buffer tube 33 to be cut.

Second inner surface 9 of holder 2 includes a second slot 10, which extends substantially parallel to said channel 4 and extends inwardly into said second surface 9 and from said front end 5 toward the back end 6 and terminates at a terminus 11.

Second holder 12, shown in FIGS. 6–9, has an outer third surface 13, which when holders 2 and 12 are joined faces said first slidable surface 3, and an outer fourth surface 25 which faces said second surface 9 extending at an angle to said third surface 13. Surface 13 includes an outwardly-opening second channel 14 extending inwardly from said third surface 13 and from a front end 15 of holder 12 to a back end 16. Second channel 14 is preferably semi-circular in cross section and has a diameter commensurate with that of first channel 4. When said holders 2 and 12 are joined, and said surfaces contact, semi-circular channels 4 and 14 interface and align, forming a substantially cylindrical passageway 17, as shown in FIG. 2, having a diameter commensurate with the outer diameter of the buffer tube 33 to be slit therein. When holders 2 and 12 are conjoined, the front end 15 and the back end 16 of holder 12 align, respectively, with the corresponding front 5 and back 6 ends of holder 2, as shown in FIGS. 1 and 2.

Second holder 12 includes a first guiding means extending outwardly from said third surface 13 and a second guiding means extending from said fourth surface 25 for entering into said first slot 7 and second slot 10, respectively, when said holders 2 and 12 are conjoined. In the presently preferred embodiment the first guiding means comprises a pair of outwardly-extending pins 18 and 19 on said third surface 13 and having a length and size commensurate with that of first slot 7 of holder 2 and adapted to engage said slot 7 when said holders 2 and 12 are conjoined. Although cylindrical pins 18 and 19 are shown, the pins 18 and 19 can have other cross-sectional shapes, e.g. square, rectangular, etc. Leading pin 18 is so positioned on surface 13 that upon engagement of said holders 2 and 12, pin 18 abuts terminus 8 when the front 5 and back 6 ends of holder 2 align with the front 15 and back 16 ends of holder 12. Surface 13 also includes a recessed portion 20 open to said channel 14 and hence passageway 17.

Extending from said recessed portion 20 into the passageway 17 is a first blade 21 made of metal, e.g. stainless steel or steel alloy. Blade 21 is a slotted flat blade preferably having a chevron-shaped cutting edge 22 and is mounted to holder 12 by means of a screw 23 extending through a blade slot or hole 24 (see FIG. 8). As shown in FIGS. 2, 6 and 7, the plane of the blade 21 is substantially perpendicular to said passageway 17 and substantially intersects the axis of the passageway 17. Blade 21 therefore cuts the buffer tube 33 longitudinally along the axis of the tube after insertion of said tube into the tube slitting tool 1 and during the relative longitudinal movement of said tube 33 and the tool 1. The blade 21 can be set to have a predetermined depth of cut, but if desired, the blade 21 can have a slot 24 so that the depth of the cut is adjusted by loosening said screw 23 and repositioning the blade 21 along the blade slot 24.

Said second guiding means in the presently preferred embodiment also preferably comprises a pair of outwardly-extending pins 26 and 27 on said fourth surface 25, which as with pins 18 and 19, have a length and size commensurate with that of said second slot 10 and are adapted to engage the side walls of said slot 10. Although cylindrical pins 26 and 27 are shown, the pins 26 and 27 can have other cross-sectional shapes, e.g. square, rectangular, etc. Upon full engagement of said holders 2 and 12 and alignment of the front 5, 15 and back 6, 16 end surfaces, respectively, leading pin 26 within said second slot 10 abuts terminus 11. As with the third surface 13, the fourth surface 25 further includes a recessed portion 28 open to said channel 14 and hence the passageway 17. Extending from said recessed portion 28 into said passageway 17 is a second blade 29, which as with first blade 21, is a flat blade preferably having a chevron-shaped cutting edge 30. The plane of the blade 29 is also substantially perpendicular to said passageway 17, substantially intersects the axis of passageway 17 and is angularly displaced from the plane of blade 21. Blade 29 is secured to said holder 12 by a screw 31, and as with the blade 21, the blade 29 can be set to a predetermined depth of cut but if desired, the blade 29 can have a slot 32 so that the depth of the cut is adjustable using blade slot 32.

As shown in FIGS. 2, 6 and 7, both blades 21 and 29 are mounted on holder 12, thereby facilitating blade recalibration and replacement. Both blades are disposed with their chevron-shaped cutting edges 22 and 30, respectively, extending into passageway 17. The chevron shape of the cutting edges 22 and 30 allows the blades to cut the buffer tube 33 when the tool 1 or the tube 33 is pulled in either direction. As also shown in the figures, blades 21 and 29 preferably oppose one another, i.e., the blades have the same axial position along the passageway 17, and the respective planes of the blades 21 and 29 are at a substantially right angle. It should be understood, however, that other angles, e.g., acute or obtuse, may be employed. By not axially displacing the blades along the passageway 17 as shown in the prior art and maintaining the blade angle at substantially 90 degrees, the sectional cut of buffer tube 33 made by the tool 1 of the present invention minimizes tube intervention and eliminates or reduces movement of any optical fibers 35 under the cutting path. The blades 21 and 29 should extend into passageway 17 a distance slightly greater than the outer thickness of the buffer tube 33, which can be multilayered, but not so far as to damage any optical fibers 35, or ribbons containing optical fibers and replacing the individual optical fibers 35, enclosed therein, as shown in FIG. 11.

In operation, the tube slitting tool 1 of the present invention is lightweight, compact and simple to use. After separating the holders 2 and 12, a portion of the buffer tube 33 to be cut is placed on holder 2 so that the tube 33 is within channel 4. Supporting the holder 2 and tube 33 in one hand, the user then guides leading pins 18 and 26 of holder 12 into slots 7 and 10 of holder 2, and slides the holders together. As the holders join, passageway 17 forms and buffer tube 33 is cut by the blades 21 and 29 extending into said passageway 17. Upon full engagement of the holders, tube 33 is encircled by the walls of the passageway 17.

By holding the tube slitting tool 1 in one hand, buffer tube 33 can then be pulled through passageway 17 with the other hand, such as in the direction indicated by the arrow F in FIG. 10. Alternatively, the tool 1, firmly-held in one hand, can be pulled in either direction and the tube 33 kept stationary. If the tool 1 is pulled to the left as viewed in FIG. 10, the holders 2 and 12 are prevented from separating by reason of the pins 18, 19, 26 and 27 and engagement of the pins 19 and 27 with the termini 8 and 11. In either case, the relative longitudinal movement of the chevron-shaped blades 21 and 29 cuts into the outer layer 34 of the tube 33 to provide a tube segment separated by the cuts from the remainder of the tube 33 as shown in FIG. 11. When cutting is complete, the holders 2 and 12 are disengaged and separated from the cut tube 33. All or a portion of the slit tube 33 can then be removed with circumferential cuts, such as by a pair of scissors, exposing the individual optical fibers 35, as shown in FIG. 10. Tube slitting tool 1 can be used to make cuts at the end portions of a tube 33 to expose the ends of optical fibers 35 or along a midportion thereof to facilitate splicing or other connection. The longitudinal length of the cut depends upon the amount of exposed optical fiber required.

It should be understood that the blades 21 and 29 may extend from the recessed portions 20 and 28, respectively, into said passageway 17 other than perpendicularly to each other, and will provide cuts in the buffer tube 33 therein circumferentially spaced at the angle between the blades. It should further be understood that the blades may be axially displaced from each other along passageway 17.

Buffer tubes 33 normally in use vary in outside diameter from about 2.0 mm to about 14 min. The diameter of the passageway 17 formed by channels 4 and 14 can be varied for different tools 1 to accommodate varying buffer tube 33 diameters. The diameter of the passageway 17 for each tool 1 is selected to closely fit the exterior of the buffer tube 33, e.g., within about 0.005 inches of the buffer tube diameter, in order that the longitudinal axis of the buffer tube 33 will be substantially coaxial with the axis of the passageway 17, thereby, to prevent uneven penetration of the tube 33 by the blades 21 and 29 and/or contact of the blades 21 and 29 with the optical fibers 35. Maintaining an angle between the blades 21 and 29, preferably at a right angle, helps reduce such problem. However, a tool 1 can be used for a range of buffer tube 33 diameters depending upon the diameter of the buffer tube 33, the thickness of the wall thereof and the ratio of the cross-sectional area of the optical fibers 35 to the internal diameter of the tube 33. In order to prevent damaging the encased optical fibers 35 within the buffer tube 33 due to an improper tool choice, the buffer tube 33 diameter size restrictions for each tool 1 may be stamped on each of holders 2 and 12, as indicated by reference numeral 36 in FIG. 10, to facilitate selection of the proper tool for the job and to prevent holder mismatching. Also, holders 2 and 12 may be tethered by a wire or plastic line 37, such as nylon, as shown in FIG. 1.

Further, either holder 2 or 12 may include buffer tube gauge grooves 38 and 39 thereon to quickly and accurately determine whether a particular buffer tube 33 will properly fit within the passageway 17 of the tool 1. The holders 2 and/or 12 can also be marked with arrows to indicate the orientation of the tool halves and the preferred direction of the pull. Grooves 38 and 39 are cut into an outer surface of holders 2 and 12 and have a depth and size sufficient to receive at least a semicylindrical portion of buffer tube 33 therein. As shown in FIG. 1, grooves 38 and 39 are preferably notched alongside one another in one of said holders 2 and 12, which may be used separately from the other holder to gauge the size of the buffer tube 33. Whereas groove 38 is configured to determine the lower bound for proper fit, i.e., those tubes 33 fitting therein are too small for the tool 1, groove 39 is configured to provide the upper bound, i.e., those tubes that are too large for the tool 1. Buffer tubes 33 outside of these bounds should not be cut with that tube slitting tool 1.

Although the preferred configuration for said passageway 17 is cylindrical and is circular in cross section, it should be understood that alternative configurations, such as square or diamond cross sections, are within the scope of the present invention.

It should also be understood that said first or said second guiding means may comprise two pins each as in the preferred embodiment or only one pin extending from said third and said fourth outer surface. It should further be understood that the pins need not be circular in cross section and may be elongated in the direction parallel to the channels 4 and 14 or can be projections continuous in the axial direction of the holder 1 provided the height and length of the pin or the projections fit within the respective slots 7 and/or 10.

Although a preferred embodiment of the present invention has been described and illustrated, it will be apparent to those skilled in the art that various modifications may be made without departing from the principles of the invention.

What is claimed is:

1. A tube slitting tool comprising:
   a first holder having opposite ends and a first inner surface between said ends, and a second inner surface between said ends and extending at a substantially perpendicular angle to said first surface, said first holder having an outwardly-opening first channel extending inwardly into one of said first surface and said second surface and from one of said ends to the other of said ends, a first slot spaced from and extending parallel to said channel and extending inwardly into said first surface and a second slot spaced from and extending parallel to the channel and extending inwardly into said second surface, at least one of said first slot and said second slot having a terminus at one end;
   a second holder having opposite ends and an outer third surface and an outer fourth surface extending at a substantially perpendicular angle to said third surface, said second holder having an outwardly-opening second channel extending inwardly from one of said third surface and said fourth surface and from one end of said second holder to the other end of said second holder, said first channel and said second channel interfacing and forming a passageway for receiving a tube to be slit therein when said first holder and said second holder are positioned with said first surface engaging said third surface and said second surface engaging said fourth surface, at least one first pin extending outwardly from said third surface and at least one second pin extending from said fourth surface, said first pin entering into said first slot and said second pin entering into said second slot when said first holder and said second holder are positioned with said first surface engaging said third surface and said second surface engaging said fourth surface, at least one of said first pin in said first slot and said second pin in said second slot abutting said terminus in said one of said first and said second slots when said first and said second holders engage; and
   two cutting blades mounted on one of said first holder and said second holder and extending into the channel in said one of said first holder and said second holder.

2. The tube slitting tool as set forth in claim 1, wherein two first pins extend outwardly from said third surface and two second pins extend outwardly from said fourth surface, said two first pins entering said first slot and said two second pins entering into said second slot.

3. A tube slitting tool comprising:

a first holder having opposite ends and a first inner surface between said ends, and a second inner surface between said ends and extending at an angle to said first surface, said first holder having an outwardly-opening first channel extending inwardly into one of said first surface and said second surface and from one of said ends to the other of said ends, a first slot spaced from and extending parallel to said channel and extending inwardly into said first surface and a second slot spaced from and extending parallel to the channel and extending inwardly into said second surface;

a second holder having opposite ends and an outer third surface and an outer fourth surface extending at an angle to said third surface, said second holder having an outwardly-opening second channel extending inwardly from one of said third surface and said fourth surface and from one end of said second holder to the other end of said second holder, said first channel and said second channel interfacing and forming a passageway for receiving a tube to be slit therein when said first holder and said second holder are positioned with said first surface engaging said third surface and said second surface engaging said fourth surface, at least a first guiding means extending outwardly from said third surface and at least a second guiding means extending from said fourth surface, said first guiding means entering into said first slot and said second guiding means entering into said second slot when said first holder and said second holder are positioned with said first surface engaging said third surface and said second surface engaging said fourth surface; and at least one cutting blade mounted on one of said first holder and said second holder and extending into the channel in said one of said first holder and said second holder.

4. The tube slitting tool as set forth in claim 3, wherein the first inner surface and second inner surface of the first holder are substantially perpendicular to each other and wherein the outer third surface and the outer fourth surface of the second holder are substantially perpendicular to each other.

5. The tube slitting tool as set forth in claim 3, wherein one of said first slot and said second slot extending inwardly into the first holder terminates at a terminus.

6. The tube slitting tool as set forth in claim 5, wherein said first slot and said second slot each terminate at a terminus.

7. The tube slitting tool as set forth in claim 3, wherein said first guiding means includes at least one pin extending outwardly from said outer third surface and wherein said second guiding means includes at least one pin extending outwardly from said outer fourth surface.

8. The tube slitting tool as set forth in claim 7, wherein said first guiding means comprises two pins and said second guiding means comprises two pins.

9. The tube slitting tool as set forth in claim 3, wherein each of said first slot and said second slot has a terminus, and wherein at least one of said first guiding means and said second guiding means abuts at least one of said terminuses when said first holder and said second holder are positioned with said first surface engaging said third surface and said second surface engaging said fourth surface.

10. The tube slitting tool as set forth in claim 3, wherein said first guiding means extending from said third surface and said second guiding means extending from said fourth surface each have a height substantially equal to the depth of the respective slot.

11. The tube slitting tool as set forth in claim 3, wherein the wall of said passageway is substantially circular in cross section.

12. The tube slitting tool as set forth in claim 3, wherein at least one of said first holder and said second holder includes a recessed portion opening to said passageway, and said at least one cutting blade is in said recessed portion.

13. The tube slitting tool as set forth in claim 12, wherein two cutting blades are mounted on said second holder, and the second holder includes two recessed portions opening to the passageway, each recessed portion having one of said cutting blades mounted therein.

14. The tube slitting tool as set forth in claim 3, wherein said at least one cutting blade lies in a plane therethrough, said plane substantially intersecting and extending substantially parallel to the longitudinal axis of said passageway.

15. The tube slitting tool as set forth in claim 14, wherein two cutting blades are mounted to one of said first holder and said second holder, each of said cutting blades lying in different planes, each of said planes substantially intersecting and extending substantially parallel to the longitudinal axis of said passageway and being angularly displaced at substantially right angles to each other.

16. The tube slitting tool as set forth in claim 3, wherein two cutting blades are mounted on one of said first holder and said second holder and extend into the respective channel.

17. The tube slitting tool as set forth in claim 16, wherein said two cutting blades are substantially perpendicular to each other.

18. The tube slitting tool as set forth in claim 3, wherein said at least one cutting blade has an adjustment means to move said at least one cutting blade toward and away from said passageway.

19. The tube slitting tool as set forth in claim 18, wherein said adjustment means is a blade slot in said at least one cutting blade, and wherein said at least one cutting blade is held at a selected position within the blade slot by a screw.

20. The tube slitting tool as set forth in claim 3, wherein said at least one cutting blade is chevron-shaped.

21. The tube slitting tool as set forth in claim 3, wherein said at least one cutting blade is made of stainless steel.

22. The tube slitting tool as set forth in claim 3, wherein at least one of said first holder and said second holder includes a plurality of gauge notches.

23. The tube slitting tool as set forth in claim 3, wherein at least one of said first holder and said second holder includes an identification mark indicating which size of buffer tube can be used in said tool.

24. The tube slitting tool as set forth in claim 23, wherein said first holder and said second holder include said identification mark.

25. The tube slitting tool as set forth in claim 3, wherein said first holder and said second holder are each connected to an end of a tether.

* * * * *